United States Patent
Gerencsér (10) Patent No.: US 9,359,035 B2
(45) Date of Patent: Jun. 7, 2016

(54) FOLDABLE BICYCLE

(75) Inventor: Gábor Gerencsér, Szekesfehervar (HU)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/234,280

(22) PCT Filed: Jul. 20, 2012

(86) PCT No.: PCT/HU2012/000062
§ 371 (c)(1),
(2), (4) Date: Jul. 10, 2014

(87) PCT Pub. No.: WO2013/014477
PCT Pub. Date: Jan. 31, 2013

(65) Prior Publication Data
US 2014/0327226 A1     Nov. 6, 2014

(30) Foreign Application Priority Data

Jul. 22, 2011 (HU) .................................. P 1100396

(51) Int. Cl.
*B62K 15/00*       (2006.01)

(52) U.S. Cl.
CPC .............. *B62K 15/00* (2013.01); *B62K 15/008* (2013.01)

(58) Field of Classification Search
CPC .............. B62K 15/008; B62K 15/006; B62K 2015/005
USPC ................................................ 280/278, 287
See application file for complete search history.

(56) References Cited

U.S. PATENT DOCUMENTS

| | | | |
|---|---|---|---|
| 4,296,940 A * | 10/1981 | Herbert | 280/278 |
| 4,718,688 A * | 1/1988 | Sanders | 280/278 |
| 4,895,386 A | 1/1990 | Hellestam et al. | |
| 5,069,468 A * | 12/1991 | Tsai et al. | 280/278 |
| 6,196,566 B1 * | 3/2001 | Zhang | 280/287 |
| 6,286,848 B1 * | 9/2001 | Augustin | 280/287 |
| 6,530,589 B1 * | 3/2003 | Ma | 280/278 |
| 6,695,334 B2 * | 2/2004 | Irlbacher | 280/278 |
| 6,799,771 B2 * | 10/2004 | Bigot | 280/278 |
| 6,877,756 B2 * | 4/2005 | Yamabe | 280/287 |
| 6,979,013 B2 * | 12/2005 | Chen | 280/287 |
| 7,216,410 B2 * | 5/2007 | Chuang | 29/428 |
| 7,306,249 B2 * | 12/2007 | Kwok et al. | 280/278 |

(Continued)

FOREIGN PATENT DOCUMENTS

DE   202004006563 U1    9/2004
JP        61171680 U    10/1986

OTHER PUBLICATIONS

International Search Report and Written Opinion mailed Oct. 24, 2012 for PCT/HU2012/000062.

*Primary Examiner* — Joseph Rocca
*Assistant Examiner* — Michael Stabley
(74) *Attorney, Agent, or Firm* — Ingrassia Fisher & Lorenz PC (57) ABSTRACT

A foldable bicycle is provided in its self-propelled use position in its folded-out state, for transporting and for storage in its folded-up state and in both its folded-out and folded up states has fixing components for maintaining the reliability of these states, and in its folded-up state it has significantly lower space demand as compared to its folded-out state.

13 Claims, 5 Drawing Sheets

(56) References Cited

U.S. PATENT DOCUMENTS

| | | | |
|---|---|---|---|
| 7,367,576 B2 * | 5/2008 | Pan | 280/278 |
| 2005/0062256 A1 | 3/2005 | Chen | |
| 2005/0230933 A1 * | 10/2005 | Woo | 280/278 |
| 2006/0061060 A1 | 3/2006 | Chen | |
| 2007/0158928 A1 * | 7/2007 | Wu | 280/278 |
| 2008/0303243 A1 * | 12/2008 | Ying | 280/287 |
| 2010/0066054 A1 * | 3/2010 | Chen | 280/278 |
| 2011/0193313 A1 * | 8/2011 | Yun | 280/278 |

\* cited by examiner

FOLDABLE BICYCLE

CROSS REFERENCE TO RELATED APPLICATIONS

This application is a U.S. National Stage entry under 35 U.S.C. 371 based on International Application No. PCT/HU2012/000062, filed Jul. 20, 2012, which claims priority to Hungary Application No. P 11 00396, filed Jul. 22, 2011, all are which hereby incorporated in their entirety by reference.

TECHNICAL FIELD

The technical field relates to a foldable bicycle, which vehicle is suitable for use as a means of transport (I) in its self-propelled use position in its folder-out state, for transporting (II) and for storage (III) in its folded-up state. In both its folded-out and folded-up states it has fixing components for maintaining the reliability of these states, and in its folded-up state it has significantly lower space demand as compared to its folded-out state.

BACKGROUND

In the same as with rigid frame-structured bicycles unsuitable for being folded the bicycle has a frame structure fitted with a front wheel and a rear wheel, a handlebar column fitted to the frame structure, handlebars fitted to the handlebar column, a seat post also fitted to the frame structure and a seat fitted to the seat post, furthermore it has a drive chain, and crank arms fitted with pedals as well as a drive mechanism including chain wheels.

The frame structure is assembled from parts that, by releasing the aforementioned fixing components, are capable of movement as compared to each other, characteristically relative angular rotation, for the purpose of realizing the relative angular rotation there are structural elements, favorably hinge joints, permitting this inserted between the parts of the frame structure that are connected to each other.

Bicycles are transport and sport devices known for a long time with a light metal frame. In general they are chosen as transportation in order to reach destinations at a relatively short distance. They have special significance in urban transportation, where, as opposed to motor vehicles that use liquid fuel, due to both environmental and parking aspects and bicycles have clear advantages.

If the bicycle has to be taken for a longer distance and used there for transport, tourism or competition sport purposes, then the significant part of the longer distance is overcome with a transportation vehicle. In such cases it is favorable if the bicycle takes up as small a space as possible. In this way various types of foldable bicycle were created, which now have been around for a century.

The common structural idea of the uncountable number of versions of foldable bicycle developed is based on that their frame structure needs to be established from a frame that has at least folding axis. In general the folding axis, or the most important one if there is more than one axis, is positioned vertically or more rarely horizontally. The solutions with a vertical folding axis usually have two frame elements that can be folded next to each other around a hinge joint with a vertical axis. For this the main part of the frame is divided at approximately the middle for the purpose of being able to position the hinge joint. Besides their advantageous simplicity an unfavorable aspect is that folding requires many movements, and when being used they create a risk of accident mainly because clothing can be caught up.

The versions with a horizontal folding axis are partially simpler and partially more complex than the previous versions. Their operation is simple, however, their structural construction as this is a multi-hinged mechanism is clearly complex. It is also unfavorable that when folded the wheels are positioned one behind the other, so they cannot be transported by rolling. Due to the complexity of their structure their manufacture is costly.

In the case of a certain type of frame with a horizontal hinge axis they have overcome the issue of the wheels being behind one another. In this way the folded vehicle can be rolled as wheeled luggage. However, the horizontal hinges demand sliding connections or detachable frame elements, due to which in their folded state, on the one hand, the vehicle has an unfavorable geometric shape and, on the other hand, is unusually large.

Special solutions that cannot be categorized in any of the previous versions also exist. Among them there is a type that does not demand the division of the main part of the frame structure. This apparent advantage, however, also comes with many more disadvantages. Primarily because their structure and operation is complex, and their production is costly, and due to this not a single one of these types of vehicle has become widespread.

A special foldable bicycle from the recent decades is presented in patent specification registration number HU 185.269. Its specialness is conspicuous in two respects. On the one hand, because it is fitted with a series of solar cells, and so they are not only suitable for providing power to the usual fittings of the bicycle, there is also the possibility for battery-powered drive. Another special feature is that it can be folded into the shape of a bag. Due to both of these special features, mainly due to the latter, there structural construction is complex. Changing the bicycle from folded-out state to folded-up state (and vice versa) is also complicated and takes a great deal of time.

"Foldable bicycle" with registration number HU 220.140 has a significantly simpler structure than the previous version". However, it is unfavorable that neither the main frame between the wheels, the double cross-tube nor the handlebar column can be shortened when folding, and so, in this way, its transporting size is hardly smaller when in folded-out state for use. For the purpose of folding to as small a size as possible both the handlebar column and the seat post are telescopic in the solution according to Hungarian patent application number P 0203480. The main parts of the frame are connected to each other with spring connections, but the optimal harmonization of the spring characteristics and their permanence over time cannot be guaranteed.

In the case of patent specification registration number EP 1 494 916 for the purpose of the efficiency of folding the handlebars are broken up with hinges, the seat part has a telescopic structure, and the front wheel can be folded to the frame cross bar and the rear wheel can be folded to the seat post. It is unfavorable, however, that in transportation state the stability of the bicycle has to be separately ensured.

More or less similar structural and use disadvantages can be determined in the cases of European patent specifications registration numbers EP 1 575 823 B1 and EP 1 638 835 B1 in connection with their solutions. The common deficiency of these and of the known solutions in general is that they cannot be stored vertically or in a way that saves space, and in the case of most of them a relatively large number of movements are needed to fold them up and fold them out.

The relatively most developed type of the known foldable bicycles can be seen in patent specification registration number U.S. Pat. No. 7,140,629. Its main advantage comes from the horizontal arrangement of the central hinge axis, which results in a rigidity that is much greater than in previous versions. When compared to vertical hinge axis solutions this is especially apparent in that and when a heavy person rides standing up on an uneven road. In the case of old foldable bicycles at such times there was a risk of the bicycle breaking, which the given idea overcomes. Its disadvantages, however, are that a great deal of friction has to be overcome when folding up and unfolding the bicycle, which makes use difficult, furthermore, that the seat post does not close sufficiently into the rear frame part and that in folded up state the axles of the two wheels are at an angle to one another, which makes rolling impossible.

In view of the foregoing, at least one object is to develop a foldable bicycle that retains the advantages of the earlier similar structures but that avoids their deficiencies. Namely, one that can be folded up and opened out with much fewer movements, that can be produced using fewer and simpler components as compared to the more developed types, and, besides this, one that remains mobile in folded up state, in other words it can be moved around without carrying it by rolling. It is also at least one that when dismantling the front part of the frame containing the front wheel should be rotatable to beside the part containing the rear wheel, so that the axles of the two wheels fall in a single common line (coincide), because this makes rolling possible when the bicycle is folded up. Furthermore, other objects, desirable features and characteristics will become apparent from the subsequent summary and detailed description, and the appended claims, taken in conjunction with the accompanying drawings and this background.

SUMMARY

At least one idea behind the embodiments is the recognition that if the frame structure is formed as a four-member, three-dimensional kinematic chain linked up with unique hinge joints, which hinge joints make it possible to move the members of the chain in three dimensions—as compared to each other—then the task can be solved. At least another idea behind the embodiments is that the central hinge joint forming the "heart" of the four-member kinematic chain is able to form a slanted fold-up axis along, which the front member of the chain can be moved slightly upwards and turned beside the rear member of the chain. Through this what we want to achieve can actually be realized.

In accordance with at least one object of the foldable bicycle according to the embodiments, which vehicle is suitable for use as a transport (I) in its self-propelled use position in its folded-out state for transporting (II) and for storage (III) in its folded-up state and in both its folded-out and folded up states has fixing components for maintaining the reliability of these states. In its folded-up state it has significantly lower space demand as compared to its folded-out state, in the same as with rigid frame-structured bicycles unsuitable for being folded the bicycle has a frame structure fitted with a front wheel and a rear wheel, a handlebar column fitted to the frame structure, handlebars fitted to the handlebar column, a seat post also fitted to the frame structure and a seat fitted to the seat post, furthermore it has a drive chain, and crank arms fitted with pedals as well as a drive mechanism including chain wheels, the frame structure is assembled from parts that, by releasing the aforementioned fixing components, are capable of movement as compared to each other, characteristically relative angular rotation.

For the purpose of realizing the relative angular rotation there are structural elements, favorably hinge joints, permitting this inserted between the parts of the frame structure that are connected to each other, is set up in such a way that the frame structure is formed by a four-member kinematic chain forming a three-dimensional rectangle, which has a rear member belonging to the rear wheel, a front member belonging to the front wheel and so supporting the handlebar column. A third member supporting the seat post, and a connection rod inserted between the front and third members also realizes the spatial rigidity of the entire frame structure when it is in its use position.

Among the hinge joints permitting spatial rotation of the members of the kinematic chain as compared to each other it also has a central hinge joint between the rear member and the front member permitting the turning of the front member underneath the rear member, a lower hinge joint between the front member and the connection rod serving to guide the front member before being turned underneath, an upper hinge joint at the other end of the connection rod providing the connection of the connection rod to the third member and a rear hinge joint pair encompassing the rear end of the rear member as a fork and permitting the turning of the third member along the rear member. Among which the axis line (A) of the central hinge joint is slanted in two directions, because in top view it is at a slight, favorably maximum of approximately 20° angle ($\alpha$) to the horizontal lateral central axis (x-x) perpendicular to the longitudinal vertical central plane (y-y) of the vehicle, and in rear view it is also at a slight, favorably maximum approximately 20° angle ($\beta$) to the longitudinal vertical central plane (y-y).

A further feature of the foldable bicycle may be that the rear end of the rear member is established as a gusset plate, which is perpendicular to the axis of rotation of the rear wheel and which receives the rear wheel as a wheel hub also permitting the turning of the rear member. The front end of the rear member by the central hinge joint is connected to the front member via the central hinge joint, while the axis of the central hinge joint is at an angle deviating from the perpendicular to the longitudinal, vertical central plane (y-y) of the vehicle, and the wheel hub of the chain wheel of the drive mechanism is embedded in the rear connection head. The front member has a front connection head ending in the front hinge joint, which receives the central hinge joint. The front member has an operating lever making closing and opening easier with respect to the rear member, which lever is positioned near the front connection head, favorably as close as possible to the lower hinge joint.

In one embodiment, the third member has a third connection head receiving the upper hinge joint and, furthermore, which is suitable for supporting the seat post. The front member has a supporting head supporting the handlebar column and also connecting the fork blade of the front wheel. The upper hinge joint and the lower hinge joint at the ends of the connection rod are both ball joints. The members of the rear hinge joint pair encompass the rear wheel and their common axis of rotation is perpendicular to the longitudinal, vertical central plane (y-y) of the vehicle.

When the vehicle is in its state for use as a means of transport (I) the lock hook on the rear member and the lock hook on the front member grasp one another. When the vehicle is out of use in its state suitable for transportation (II) and storage (III) the lock hook on the rear member and the lock hook on the third member grasp one another. The lock hook of the rear member has a spring suitable for fixing and releasing the locked states of the mutually grasped positions of the lock hook of the front member and the lock hook of the third member.

In one embodiment of the bicycle in its state suitable for transportation (II) and storage (III) the axis of rotation of the front wheel and the axis of rotation of the rear wheel are horizontal and form a continuation of each other. In the state suitable for use as a means of transport (I), and in the state suitable for transportation (II) and storage (III) the seat post is always in a fixed position as a result of the lock on the third member. In another embodiment when in the state suitable for transportation (II) and out of use the vehicle has at least one supporting roller to increase stability of rolling. At these times the supporting roller is positioned on the supporting head of the front member between the handlebar column and the fork blade of the front wheel. In another possible embodiment the rear member of the vehicle has two gusset plates encompassing the rear wheel, and it also has a luggage rack that is rigidly attached via the fixing point to these gusset plates and via the supporting piece to the part of the rear member in front of the rear wheel. In such a case two supporting rollers are positioned on the two edges of the rear end of the luggage rack to increase rolling stability in the state suitable for transportation (II) and to promote rolling itself.

The foldable bicycle according to embodiments has numerous advantageous characteristics when compared to that known to date. All of these, directly or indirectly, lead back to the recognitions declared as the idea behind the invention. Their essence is that the four hinge jointed spatial kinematic chain makes such a folding characteristic possible that was not present in the earlier solutions. Especially conspicuous is that in the spatial kinematic chain the relative spatial rotations of the members of the chain as compared to each other make it possible for the front member of the bicycle frame, as a consequence of the central hinge joint with its specially positioned axis—to be turned next to the rear member of the frame, and within this feature the axes of rotation of the two wheels are expressly in line with each other.

Geometrically what takes place is that during folding the front member of the frame,—and the front wheel with it, is capable of movement along a flat cone around the slanted axis of the central hinge joint as defined in the claims, and as a result of this it is able to turn to beside the rear member of the frame. This takes place in such a way that the steering axis of the front wheel gets into a position parallel with the longitudinal vertical plane of symmetry of the bicycle, but at a distance from it of approximately 15-18 cm. At this time the handlebar column only has to be turned approximately 10 degrees, and in this way the axes of rotation of the two wheels will fall in a single common line.

The recognized geometric characteristic results in simple and fast folding up and unfolding, in the ability to roll the bicycle when it is folded up, and in the ability to store it in a very small place. A supplementary favorable feature not to be underestimated is that both the seat post and the handlebar column retain their set positions during folding up and unfolding. Besides the structural and operation advantages much better quality cycling becomes possible as compared to the earlier versions.

Also to be listed among the favorable characteristics is that the connection rod forming one of the members of the kinematic chain is suitable for moving the seat post and the seat on it into transportation or storage position and also stabilize it during the closing process between the front member and rear member of the frame. The storage position expressly and surprisingly requires a small amount of space.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or the following detailed description.

Figure 1:
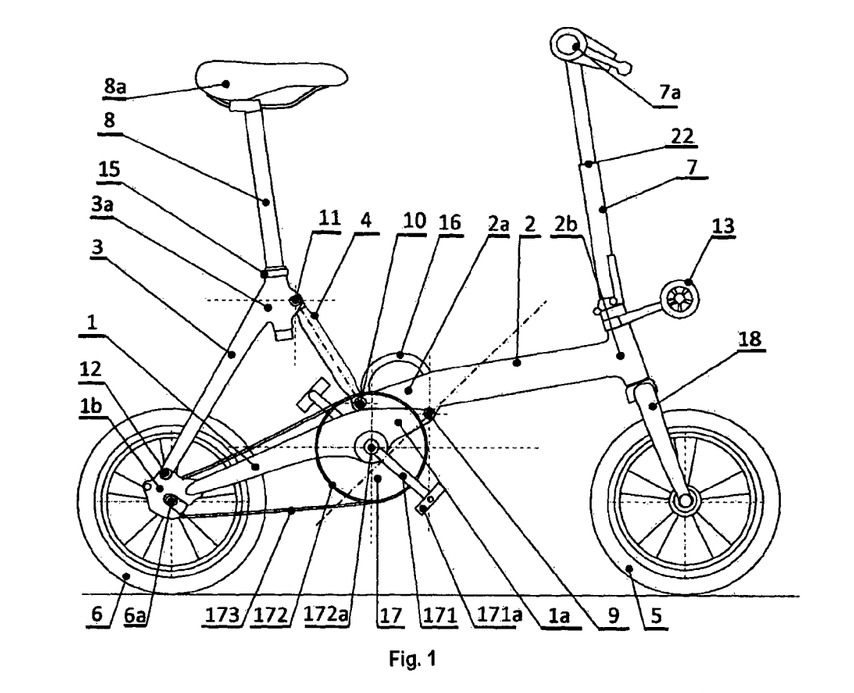
FIG. 1 shows an embodiment without a luggage rack, opened out in side view.

In FIG. 1 an embodiment of the bicycle is shown in side view and in its self-propelled use position suitable for use as a means of transport (I). The spatial kinematic chain having four parts and embodying the idea behind the embodiments is formed by the rear member 1, the front member 2, the third member 3 and the connection rod together.

The members of the kinematic chain are connected to each other in a way permitting spatial angular rotation relative to each other via the central hinge joint 9, the lower hinge joint 10, the upper hinge joint 11 and the rear hinge joint pair 12. As it can be seen the central hinge joint 9 creates a connection between the rear member 1 and the front member 2, the lower hinge joint 10 between the front member 2 and the connection rod 4, the upper hinge joint between the connection rod 4 and the third member 3, and the rear hinge joint pair 12 between the third member 3 and the gusset plate 1b strengthened by the rear member 1. Among the wheels of the bicycle the front wheel 5 is attached to the front member 2 and the rear wheel 6 to the rear member 1. In a way similar to traditional bicycles the handlebar column 7 with handlebars 7a is in an operation connection with the front wheel 5 via the front fork blades 18 encompassing the front wheel 5, while the seat post 8 ending in the seat 8a at its upper end transmits the weight of the travelling person—as useful load—via the third member 3 supplemented with the third connection head 3a and via the gusset plate 1b receiving the axis of rotation 6a of the rear wheel 6 to the rear wheel 6.

Also similar to traditional bicycles is the drive mechanism 17, which includes the crank arms 171 fitted with pedals 171a (see also FIG. 3), the chain wheel 172 and the drive chain 173. The wheel hub 172a of the chain wheel 172 is embedded into the rear member 1. The aforementioned components can be seen in FIG. 2, where we present the bicycle in folded up state suitable for transportation (II) in side view as well as in FIG. 3 as well, where we present it in rear view. It is easily visible in the latter that the front member 2 of the frame structure is turned down beside the rear member 1 in such a way that the front wheel 5 and the rear wheel 6 are next to each other and that the axis of rotation C of the rear wheel 6 and the axis of rotation D of the front wheel 5 fall in one line as a continuation of each other.

Figure 3:
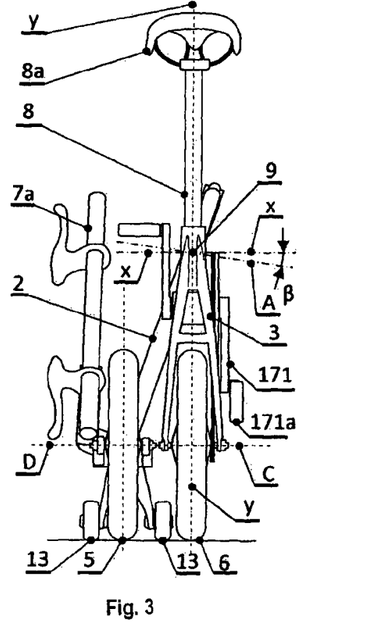
FIG. 3 shows the same, but folded up in rear view.

Also indicated on FIG. 3 is that in rear view the slanted axis of rotation. A of the central hinge joint 9 is at a slight angle to the longitudinal, vertical plane y-y of the vehicle, which angle does not exceed approximately 20°. Furthermore, it can also be seen that the supporting roller or rollers 13 fixed to the front member 2 touch the ground when the vehicle is in its folded up state. This is in such a way that the lines of progress of the supporting rollers 13 encompass the line of progress of the front wheel 5, and in this way they ensure that the folded back position of the front wheel 5 remains secure. Through this during pulling or pushing rolling the folded up vehicle stands stable, and within continuously statically determined supporting conditions, on the ground and is able to move.

Figure 4:
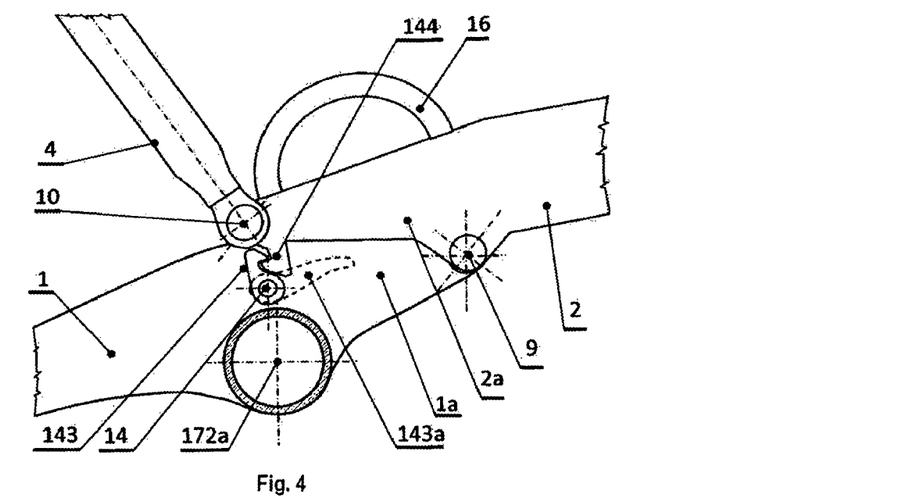
FIG. 4 shows the connection between the rear member and the front member.
Figure 5:
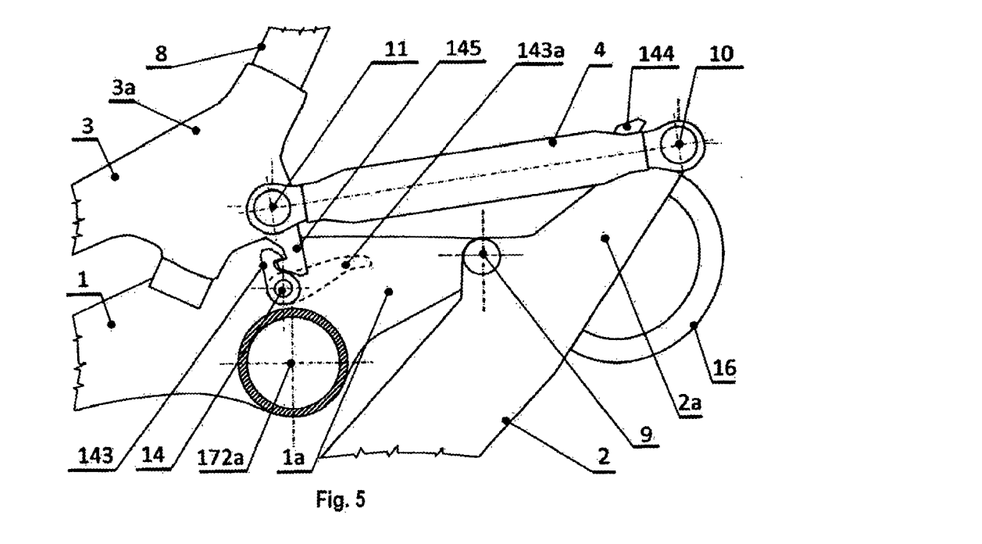
FIG. 5 shows the connection of the connection rod with them and with the third member.

In an enlarged scale FIG. 4 depicts the meeting of the rear member 1 and the front member 2 when the vehicle is in its open state. When opening is completed the lock hook 143 of the lock structure 14 on the rear member 1 connects to the lock hook 144 on the front member 2, and in this way no relative rotation of any kind can occur around the central hinge joint 9. The completion of the folding out and opening up operations around the central hinge joint 9 are assisted by the operating lever 16 positioned at the front connection head 2a of the front member 2. The lock structure 14 has a similar role in the two possible closed states of the vehicle when out of use, in the state suitable for transportation (II) and in the state suitable for storage (III). In both cases the lock hook 143 of the rear member 1 grasps the lock hook 145 of the connection head 3a of the third member 3. This is depicted on FIG. 5, also in larger scale. It can be seen here that the connection rod 4 establishes a connection between the lower hinge joint I 0 positioned on the connection head 2a of the front member 2 and the upper hinge joint 11 on the connection head 3a of the third member 3.

Figure 2:
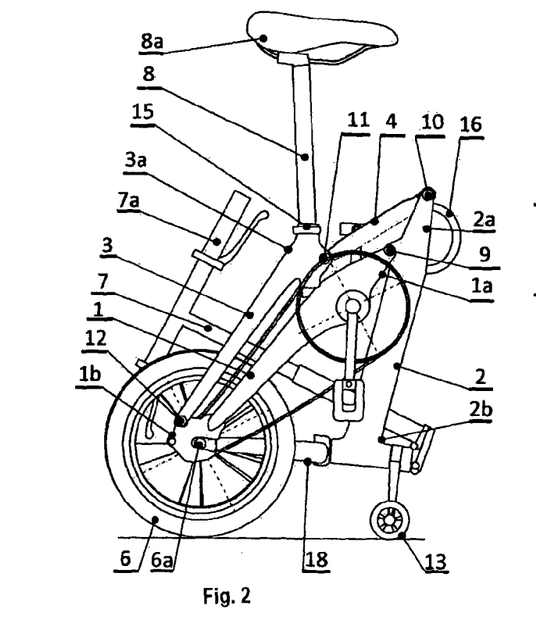
FIG. 2 shows the same, but folded up in side view.
Figure 6:
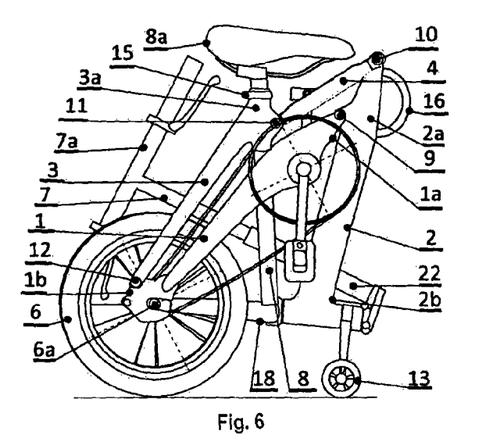
FIG. 6 shows the smallest folded up storage state.

FIG. 6 shows that as compared to the state presented on FIG. 2, in the state suitable for storage (III) it is possible to save even more space. During this, by releasing the lock 15, the seat post 8 can be pushed downwards further, and the handlebar column 7 can be made shorter at the telescopic connection 22. This telescopic connection 22 and the aforementioned lock 15 are also suitable for adapting to the size of the person using the bicycle by varying the height of the handlebar column 7 and the seat post 8.

Figure 7:
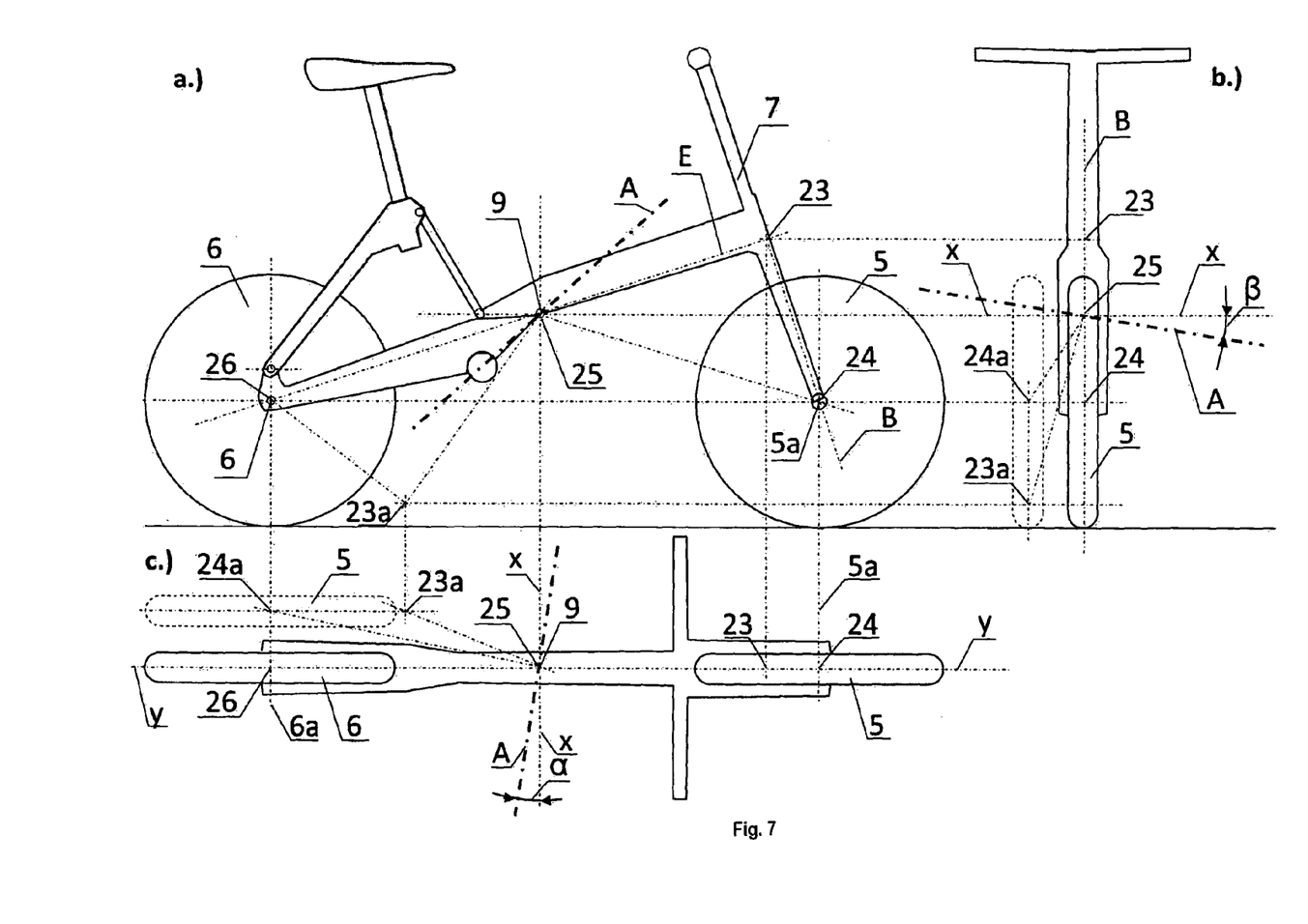
FIGS. 7a through 7c show the spatial position of the line of the axis of the central hinge joint.

Without presenting structural details FIG. 7 shows how the axis of rotation A of the central hinge joint 9 is positioned in space. In top view as compared to the longitudinal, vertical central plane y-y of the vehicle it does not fall in the line of the perpendicular lateral central axis x-x, instead it is at a slight angle a to it—advantageously not exceeding approximately 20°. This angle a and the angle mentioned in the case of FIG. 3 result in the spatial slant of the central hinge joint 9 and with it in the ability to perform the folding up of the vehicle more favorably than in the cases of all other solutions to date.

On FIG. 7a, with the bicycle in side view, the center point 24 of the axis of rotation 5a of the front wheel 5 can be seen, around which the front wheel 5 is able to change its angular position as compared to the axis of rotation B of the handlebar column 7. For example, when the bicycle need to turn a corner. The point of intersection of the axis of the central hinge joint 9, which makes possible the optimal folding up of the bicycle, with the longitudinal plane of symmetry y-y of the bicycle is the geometric center point 25 of the folding up. The perpendicular projection line E emitted from this geometrical center point 25 to the axis of rotation B of the handlebar column 7 marks the theoretical point of intersection 23 along the axis of rotation B.

The theoretical point of intersection 23, the center point 24 of the axis of rotation Sa and the geometric center point 25 form a right-angled triangle, the two latter points of which are pointed angles. On FIG. 7a the axis of rotation A of the central hinge joint 9 can be seen when the bicycle is in its folded out state—suitable for use as a means of transport. On FIG. 7b the bicycle is shown in rear view. The front wheel S is shown in folded out—initial—state with a solid line and the bicycle is also shown with a broken line in its folded up state. At this time the center point 24 of the axis of rotation 5a moves to the relocated position 24a. During folding up the axis of rotation A of the central hinge joint 9 bends in top view to the perpendicular center line x-x to under the angle a, also not exceeding approximately 20°. At this time the center point 24 of the axis of rotation Sa of the front wheel 5, also marked with a broken line, is in the relocated position 24a, while the point of intersection 23 is in the relocated position 23a.

Figure 8:
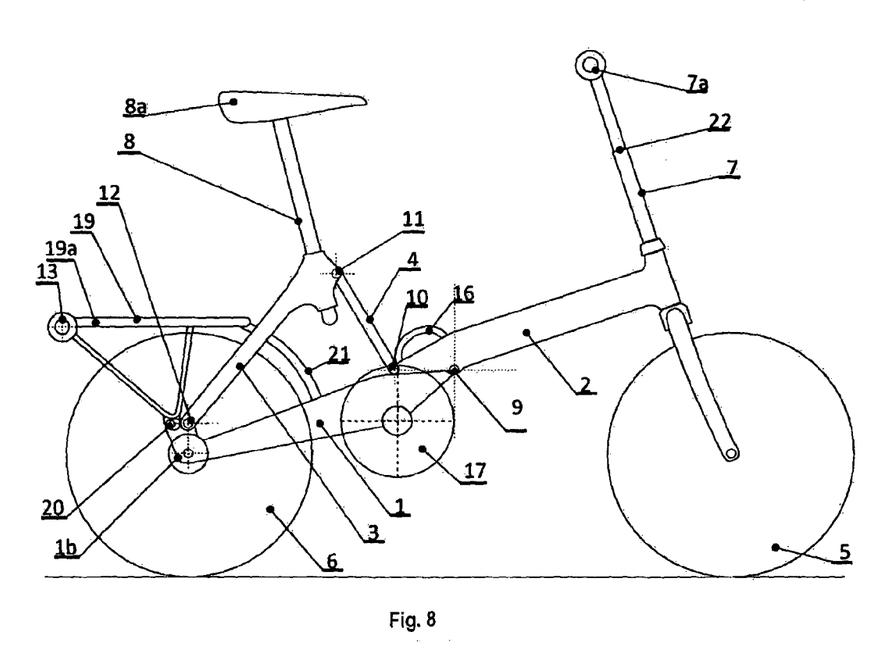
FIG. 8 shows an outline drawing of the embodiment with a luggage rack in side view.

On FIG. 8 shows another possible embodiment, in the case of which there is a luggage rack 19 located behind the third member 3 and above the rear wheel 6 as is usual in the case of traditional bicycles. The luggage rack 19 is rigidly fixed to the rear member 1—to its part above the rear wheel 6, via the fixing point 20 and the supporting piece 21. When the vehicle is folded up moves together with the rear member 1. The dimensions of the luggage rack 19 are selected so that on completion of the folding up movement the two supporting rollers 13 on the two rear edges of the luggage rack 19 just reach the ground.

From this point the bicycle folded up as above can be rolled by pushing on the front wheel 5, the rear wheel 6 and on the two supporting rollers 13, in other words supported on four points. Therefore, the luggage rack 19 fitted with supporting rollers 13 increases the stability of the bicycle when it is out of use in the state suitable for transportation (II), and also makes rolling itself possible.

Figure 9:
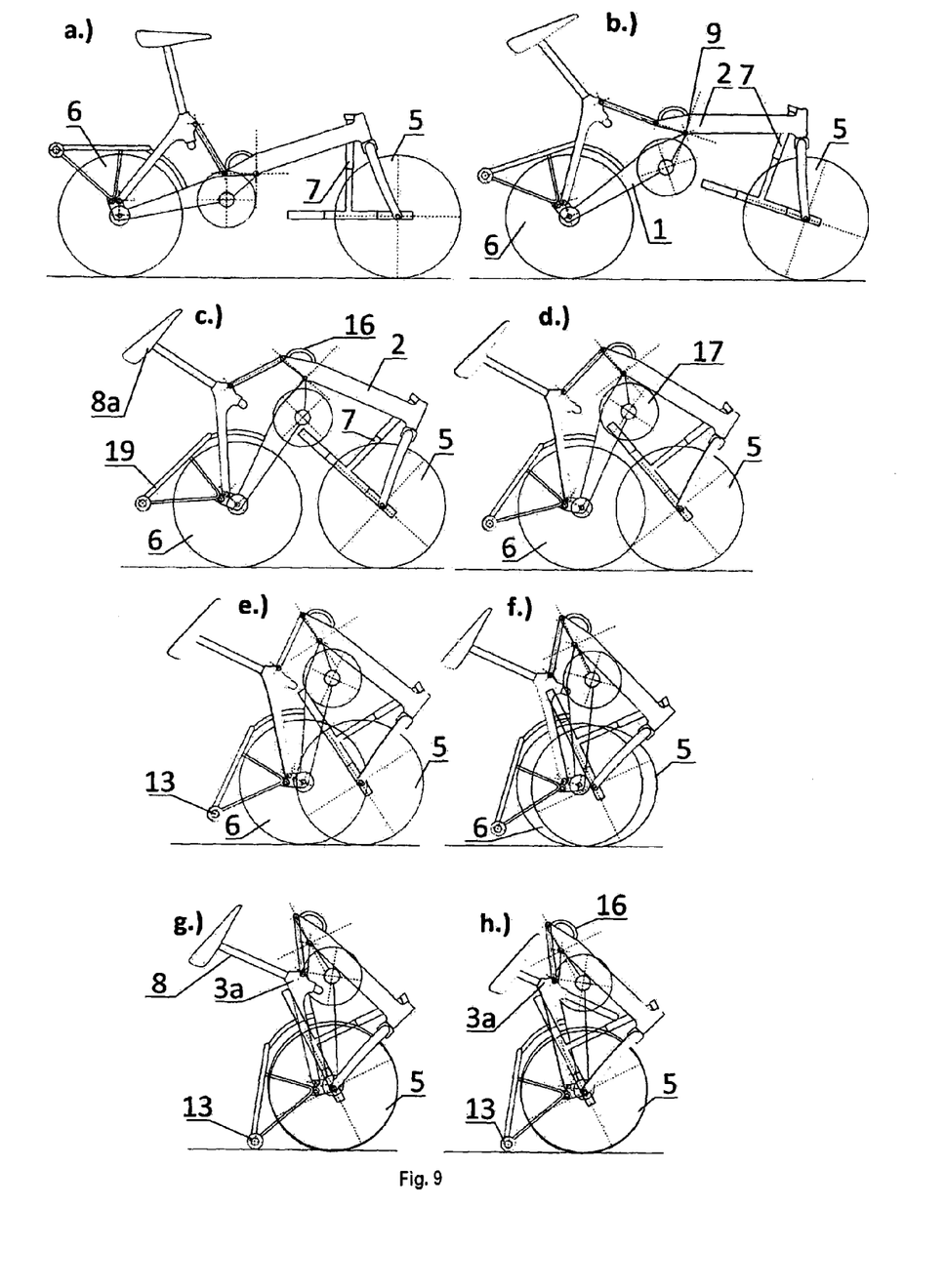
FIGS. 9a through 9h show the folding up flow diagram.

The structural details on FIG. 9 are left out, and have only illustrated the eight further sequential operation steps following the initial position according to FIG. 8. First we fold down the handlebar column 7 (FIG. 9a), then we "break" the front member 2 around the central hinge joint 9 as compared to the rear member 1 (FIG. 9b). With this the front wheel 5 is further back as compared to its original position. After this, continuing the previous operation (FIGS. 9c and 9d) the seat 8a is bent back to a slanted position, and the luggage rack moves towards the ground. In the meantime in order to move the front member 2 we grab the operating lever 16. By moving the front wheel 5 further towards the rear wheel 6, the drive mechanism 17 rises increasingly higher and the supporting roller 13 turns towards the ground (FIG. 9e and FIG. 9f), then fully reaches the ground (FIG. 9g). When the latter occurs in side view the front wheel 5 and the rear wheel 6 cover one another, in actual fact they stand beside one another on the ground, and the vehicle can then be rolled. Finally, by moving the seat post 8 in the connection head 3a the vehicle can take on its smallest position, suitable for storage (III), (FIG. 9h). During the folding process the parts of the frame perform the intermediate movement phases that can be followed on FIG. 9 from the initial state to the final state as a result of the spatial movement of axis A of the central hinge joint 9 indicated on FIG. 7.

The technical and economic significance of the foldable bicycle according to the embodiments lies in that in spite of its structural simplicity it can "do" things that earlier solutions were incapable of, and as a result of this same simplicity manufacture can be realized economically and productively.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A foldable bicycle having a frame structure comprising:
a front member having a front wheel and a handlebar column affixed thereon;
a rear member having a rear wheel affixed thereon;
a third member supporting a seat post, a seat, and a connection rod connected to said rear member and front member to form a four-member kinematic chain;
a lower joint connecting said connection rod to said front member, and an upper joint connecting said connection rod to said third member, said lower and upper joints configured as ball joints; and
a central joint connecting the front and rear members and enabling a pivoting movement of said members with respect to each other between a folded-out state, in which the bicycle is usable as a means of transport, and a folded-up state, in which the bicycle is adapted to be stored and transported,
wherein an axis (A) of said central joint deviates by an angle (α) from a direction (x-x) perpendicular to a longitudinal and vertical central plane (y-y) so as to enable a pivoting downward movement of the front member from its folded-out state towards its folded-up state, and
wherein in the folded-up state, the front wheel assumes a position in which it is laterally displaced with respect to the rear wheel and overlaps with the rear wheel in a side view and the axes (C, D) of the rear wheel and the front wheel are on a common line.

2. The foldable bicycle of claim 1, wherein in a plan view the angle (α) between the axis (A) and said perpendicular direction (x-x) is 20° at maximum, and/or in rear view the angle (α) between the axis (A) and said perpendicular direction (x-x) is 20° at maximum.

3. The foldable bicycle of claim 1, wherein a drive mechanism comprising crank arms and pedals fitted thereto is provided at said rear member.

4. The foldable bicycle of claim 1, wherein in the folded-out state a locking hook of said rear member engages a locking hook of said front member, and in the folded-up state the locking hook engages a locking hook of said third member.

5. The foldable bicycle of claim 4, wherein the locking hook of said rear member has a spring configured to fix and release the locked states of the mutually engaging positions of the locking hook of front member and the locking hook of third member.

6. The foldable bicycle of claim 1, further comprising a supporting roller configured to stabilize rolling in the folded-up state.

7. The foldable bicycle of claim 6, wherein the supporting roller is located at a supporting head of said front member between said handlebar column and a wheel fork of said front wheel.

8. The foldable bicycle of claim 6, wherein two supporting rollers are located at either side of the front wheel.

9. The foldable bicycle of claim 6, wherein the supporting roller is located at a luggage rack.

10. The foldable bicycle of claim 9, wherein two supporting rollers are located at either side of the rear wheel.

11. The foldable bicycle of claim 9, wherein the luggage rack is rigidly attached to the rear member.

12. A foldable bicycle having a frame structure comprising:
a front member having a front wheel and a handlebar column affixed thereon;
a rear member having a rear wheel affixed thereon;
a third member supporting a seat post, a seat, and a connection rod connected to said rear member and front member to form a four-member kinematic chain; and
a central joint connecting the front and rear members and enabling a pivoting movement of said members with respect to each other between a folded-out state, in which the bicycle is usable as a means of transport, and a folded-up state, in which the bicycle is adapted to be stored and transported,
wherein an axis (A) of said central joint deviates by an angle (α) from a direction (x-x) perpendicular to a longitudinal and vertical central plane (y-y) so as to enable a pivoting downward movement of the front member from its folded-out state towards its folded-up state,
wherein in the folded-up state, the front wheel assumes a position in which it is laterally displaced with respect to the rear wheel and overlaps with the rear wheel in a side view and the axes (C, D) of the rear wheel and the front wheel are on a common line, and
wherein in the folded-out state a locking hook of said rear member engages a locking hook of said front member, and in the folded-up state the locking hook engages a locking hook of said third member.

13. A foldable bicycle having a frame structure comprising:
a front member having a front wheel and a handlebar column affixed thereon;
a rear member having a rear wheel affixed thereon;
a central joint connecting the front and rear members and enabling a pivoting movement of said members with respect to each other between a folded-out state, in which the bicycle is usable as a means of transport, and a folded-up state, in which the bicycle is adapted to be stored and transported; and
a supporting roller configured to stabilize rolling in the folded-up state,
wherein an axis (A) of said central joint deviates by an angle (α) from a direction (x-x) perpendicular to a longitudinal and vertical central plane (y-y) so as to enable a pivoting downward movement of the front member from its folded-out state towards its folded-up state,
wherein in the folded-up state, the front wheel assumes a position in which it is laterally displaced with respect to the rear wheel and overlaps with the rear wheel in a side view and the axes (C, D) of the rear wheel and the front wheel are on a common line, and
wherein the supporting roller is located at a supporting head of said front member between said handlebar column and a wheel fork of said front wheel.

* * * * *